V. COLVIN.
DEVICE FOR STRETCHING SKINS.
No. 66,565. Patented July 9, 1867.
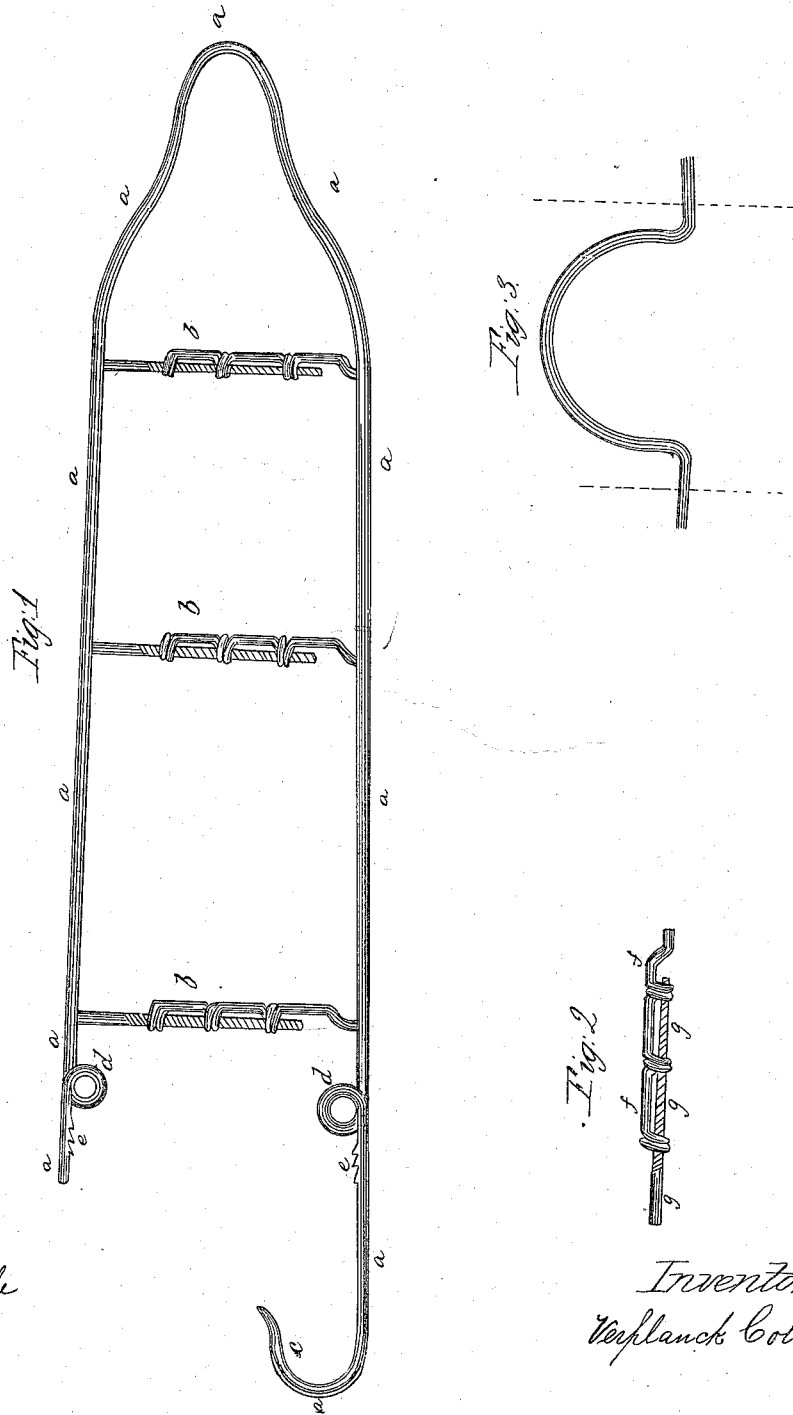

United States Patent Office.

VERPLANCK COLVIN, OF ALBANY, NEW YORK.

Letters Patent No. 66,565, dated July 9, 1867.

---

IMPROVED DEVICE FOR STRETCHING AND DRYING SKINS.

---

The Schedule referred to in these Letters Patent and making part of the same.

---

TO ALL WHOM IT MAY CONCERN:

Be it known that I, VERPLANCK COLVIN, of Albany, city and county, and State of New York, have invented a Utensil for the better Stretching and Drying of the Skins of such animals as the mink, marten, fisher, &c., or for the skins of such other animals as it may be adapted to; and I do hereby declare that the following is a full and exact description thereof, reference being had to the accompanying drawings, and to the letters of reference marked thereon.

The nature of my invention consists in forming a light framework of wire or bamboo, or other suitable material, braced by cross-pieces at proper intervals, over which the skin to be stretched and dried (having been taken from the animal so as to form a sort of long bag, with the hair or fur inside) is drawn. The stretcher being adapted to the size of the skin, and the skin fastened to the stretcher, it may then be hung up to dry.

To enable others who may be authorized to make and use my invention, I will proceed to describe its construction and operation.

I bind the wire, &c., much as shown at Figure 1, $a\ a\ a\ a\ a\ a\ a\ a\ a\ a$, twisting it at $d$ and $d$ in small rings, through which cords may be passed and attached to the skin to tie it down and keep it taut upon the frame, so that it cannot shrink. The small teeth or nicks $e$ and $e$ may be used for the same purpose when the skin is long, small ends of the skin being brought down and tied fast. The teeth prevent the cords from slipping. I finish one end of the frame in the hook $c$, by which the frame may be hung up while the skin is drying. I then attach pieces of tin (soldering them fast) so as to form "sockets," into which the ends of the braces $b\ b\ b$ are inserted. These "sockets" keep the braces from getting out of position, and also prevent them from slipping.*

Figure 2 gives a separate view of a movable brace, which, as may be seen, is easily lengthened or shortened. It consists of a rod, $f$, and a receiver, $g$, working one within the other by means of the screw-threads cut upon the "rod," and within the "receiver."

By turning the "rod" $f$ so as to increase the length of the braces, the width of the frame may also be increased, and *vice versa*.

Figure 3 shows a spring-brace, which may replace the brace before shown, if preferred. The elasticity or spring of the brace is sufficient to stretch the skin as much as may be required.

I design by my invention to replace the rude stretchers or drying-frames made by trappers from shingles, or the bent boughs of trees. The advantages I claim are, first, its convenience, being portable, light, and strong, and not apt to get broken; second, it gives a better and more regular shape to the skin, drying it in the shape which has been found best, according to the shape and size of the animal, thus rendering the pelt more salable; third, the open wire frame permits the air to pass within the skin, causing it to dry more rapidly; and when the skin is dry the frame may be withdrawn and used again, one of these frames doing the work of many heavy, brittle board stretchers. This end is also subserved by the adjustable braces, which, by being adaptable to any slight variation in the skin, obviate the necessity of carrying an unwieldy bulk of large and small-sized boards, stretchers, &c.

I propose to construct these drying-frames of different sizes, suited to the sort of animal for which they are intended, as mink size, musquash size, otter size, &c.

What I claim as my invention, and desire to secure by Letters Patent, is—

The light frame of wire or bamboo, or other suitable material, braced substantially as shown in drawings; also the rings $d\ d$, the teeth $e\ e$, and the hook $c$, for the purposes hereinbefore mentioned, essentially as before shown and described.

I do not claim the old-fashioned board or bough-stretcher; but I do claim the light, portable, and adjustable wire or bamboo, &c., drying-frame and stretcher, as aforesaid.

\* N. B.—The aforesaid "braces" may be either fixed or movable:

Fixed, when the extremities of the braces are welded or otherwise fastened to the frame, (the braces may be either simple cross-bars of wire, or spring-braces, &c.)

Movable, when the braces are not welded or otherwise fastened to the frame, and the ends merely fit into their sockets, and may be taken out and adjusted, lengthened, or shortened, to suit size of skin.

VERPLANCK COLVIN.

Witnesses:
 DANIEL J. TITTLE,
 GEO. D. HILL.